(12) United States Patent
Gooch et al.

(10) Patent No.: US 10,013,711 B2
(45) Date of Patent: Jul. 3, 2018

(54) SHOE AND/OR INSOLE SELECTION SYSTEM

(71) Applicant: Superfeet Worldwide, Inc., Ferndale, WA (US)

(72) Inventors: Matthew Gooch, Ferndale, WA (US); Eric Hayes, Ferndale, WA (US); Daniel Wakeland, Bellingham, WA (US)

(73) Assignee: Superfeet Worldwide, Inc., Ferndale, WA (US)

( * ) Notice: Subject to any disclaimer, the term of this patent is extended or adjusted under 35 U.S.C. 154(b) by 0 days.

(21) Appl. No.: 14/527,655

(22) Filed: Oct. 29, 2014

(65) Prior Publication Data
US 2016/0125499 A1 May 5, 2016

(51) Int. Cl.
*G06Q 30/00* (2012.01)
*G06Q 30/06* (2012.01)
(Continued)

(52) U.S. Cl.
CPC ......... *G06Q 30/0631* (2013.01); *A43D 1/025* (2013.01); *A43D 1/06* (2013.01);
(Continued)

(58) Field of Classification Search
CPC ............... G06Q 30/00; G06Q 30/0631; G06Q 30/0623; G06Q 30/0621; A43D 1/025; A43D 1/08; A43D 1/06
See application file for complete search history.

(56) References Cited

U.S. PATENT DOCUMENTS 5,790,256 A * 8/1998 Brown ..................... A43D 1/02
33/3 R
6,456,356 B1 9/2002 Taniguchi
(Continued)

FOREIGN PATENT DOCUMENTS

EP 2433516 A1 3/2012
WO 2013026798 A1 2/2013

OTHER PUBLICATIONS

"Identifying Clinically Meaningful Tools for Measuring Comfort Perception of Footwear," by Kathryn Mills, Peter Blanch, and Bill Vicenzino, Medicine & Science in Sports & Exercise, 42.10: pp. 1966-1971 (Oct 2010). (Year: 2010).*
(Continued)

*Primary Examiner* — Anne M Georgalas
(74) *Attorney, Agent, or Firm* — Lowe Graham Jones PLLC

(57) ABSTRACT

Embodiments are directed towards recommending a shoe and insole combination for a consumer. A variety of shoe information, insole information, and consumer foot information may be determined, which may include heel width, a width or shape, a length, a height, and arch characteristics. The foot information, the shoe information for a plurality of shoes, and the insole information for a plurality of insoles may be compared to determine at least one combination of shoe and insole that is compatible with the consumer's foot. Based on this comparison of foot information, shoe information, and insole information, a recommendation of at least one shoe and insole combination may be determined and provided to a user and/or the consumer.

26 Claims, 6 Drawing Sheets

(51) Int. Cl.
    *A43D 1/02*     (2006.01)
    *A43D 1/06*     (2006.01)
    *A43D 1/08*     (2006.01)

(52) U.S. Cl.
    CPC .......... *A43D 1/08* (2013.01); *G06Q 30/0621* (2013.01); *G06Q 30/0623* (2013.01)

(56) References Cited

U.S. PATENT DOCUMENTS

| | | | | |
|---|---|---|---|---|
| 6,741,728 | B1* | 5/2004 | Genest | A43D 1/02 |
| | | | | 382/115 |
| 6,823,550 | B2* | 11/2004 | Kantro | A43B 7/141 |
| | | | | 12/142 N |
| 8,095,426 | B2* | 1/2012 | Adelman et al. | 705/26.1 |
| 8,751,320 | B1 | 6/2014 | Kemist | |
| 2002/0023087 | A1* | 2/2002 | Vickery et al. | 707/7 |
| 2003/0110095 | A1* | 6/2003 | Danenberg | A43D 1/02 |
| | | | | 705/26.64 |
| 2004/0133431 | A1* | 7/2004 | Udiljak | A43B 7/141 |
| | | | | 705/26.1 |
| 2005/0049816 | A1 | 3/2005 | Oda et al. | |
| 2007/0043582 | A1* | 2/2007 | Peveto | A43B 3/26 |
| | | | | 705/1.1 |
| 2008/0292179 | A1* | 11/2008 | Busch | A43B 17/00 |
| | | | | 382/154 |
| 2009/0182612 | A1* | 7/2009 | Challener | G06Q 30/0269 |
| | | | | 705/14.66 |
| 2009/0208113 | A1* | 8/2009 | Bar | A43D 1/022 |
| | | | | 382/199 |
| 2009/0247909 | A1* | 10/2009 | Mukumoto | A43B 7/28 |
| | | | | 600/592 |
| 2011/0055053 | A1 | 3/2011 | Rutschmann | |
| 2011/0298897 | A1* | 12/2011 | Sareen | G06N 3/006 |
| | | | | 348/47 |
| 2013/0174445 | A1* | 7/2013 | Hakkala | A43B 7/28 |
| | | | | 36/43 |
| 2016/0081435 | A1* | 3/2016 | Marks | H04N 13/0275 |
| | | | | 382/154 |
| 2016/0206242 | A1* | 7/2016 | Esposito | A61B 5/1038 |

OTHER PUBLICATIONS

"Identifying Clinically Meaningful Tools for Measuring Comfort Perception of Footwear," by Kathryn Mills, Peter Blanch, and Bill Vicenzino, Medicine & Science in Sports & Exercise, 42.10: pp. 1966-1971 (Oct. 2010) (Year: 2010).*
PCT International Search Report dated Jan. 29, 2016, 5 pages.
Jul. 2015 Update Appendix 1: Examples; 22 Pages.
*MCRO, Inc.* v. *Bandai Namco Games America;* United States Court of Appeals for the Federal Circuit; Dated Sep. 13, 2016; 27 Pages.
Memorandum: Recent Subject Matter Eligibility Decisions; United States Patent and Trademark Office; Dated Nov. 2, 2016; 4 Pages.

* cited by examiner

SHOE AND/OR INSOLE SELECTION SYSTEM

TECHNICAL FIELD

The present invention relates generally to footwear, and more particularly, but not exclusively, to a system that can recommend footwear and/or insoles or a combination thereof for a consumer.

BACKGROUND

Today, many consumers purchase shoes, insoles, and other footwear items based on looks or feel, rather than the combination of a shoe and insole being a good anatomical fit for the consumer. If a consumer goes into a retail store to purchase shoes or other footwear, the consumer's ability to select a proper shoe and/or insole is generally limited by the consumer's limited knowledge about feet, shoes, insoles, and the relationship between them. Typically, a consumer tries on a few pairs of shoes and selects the pair that feels the most comfortable. However, many consumers may not know what a long-term functional and comfortable shoe or even an anatomically compatible shoe/insole feels like.

Sometimes consumers obtain advice from sales workers to select a shoe or insole. But the worker's efforts are typically only as good as the feedback they receive from the consumer. Since the worker cannot see the interaction between the foot, shoe, and insole, the worker relies on the consumer to tell them how the shoe is fitting. The worker may ask questions, such as "is the shoe comfortable," "is the shoe too tight," or "how does that feel." These questions are rather vague and can lead to vague answers. Since most consumers may not know what a properly functioning, comfortable shoe is supposed to feel like, they may not be able to give accurate feedback as to how the shoe is actually fitting. So, the ability of the worker to suggest a proper shoe or insole for a consumer is often reliant on unreliable information from uninformed or misinformed consumers. This fitting problem is often compounded when consumers purchase shoes and/or insoles online because the consumer doesn't have the opportunity to try on the shoes or insoles. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like components throughout the various figures unless otherwise specified.

For a better understanding of the present invention, reference will be made to the following Detailed Description, which is to be read in association with the accompanying drawings, wherein.

DETAILED DESCRIPTION

Figure 1:
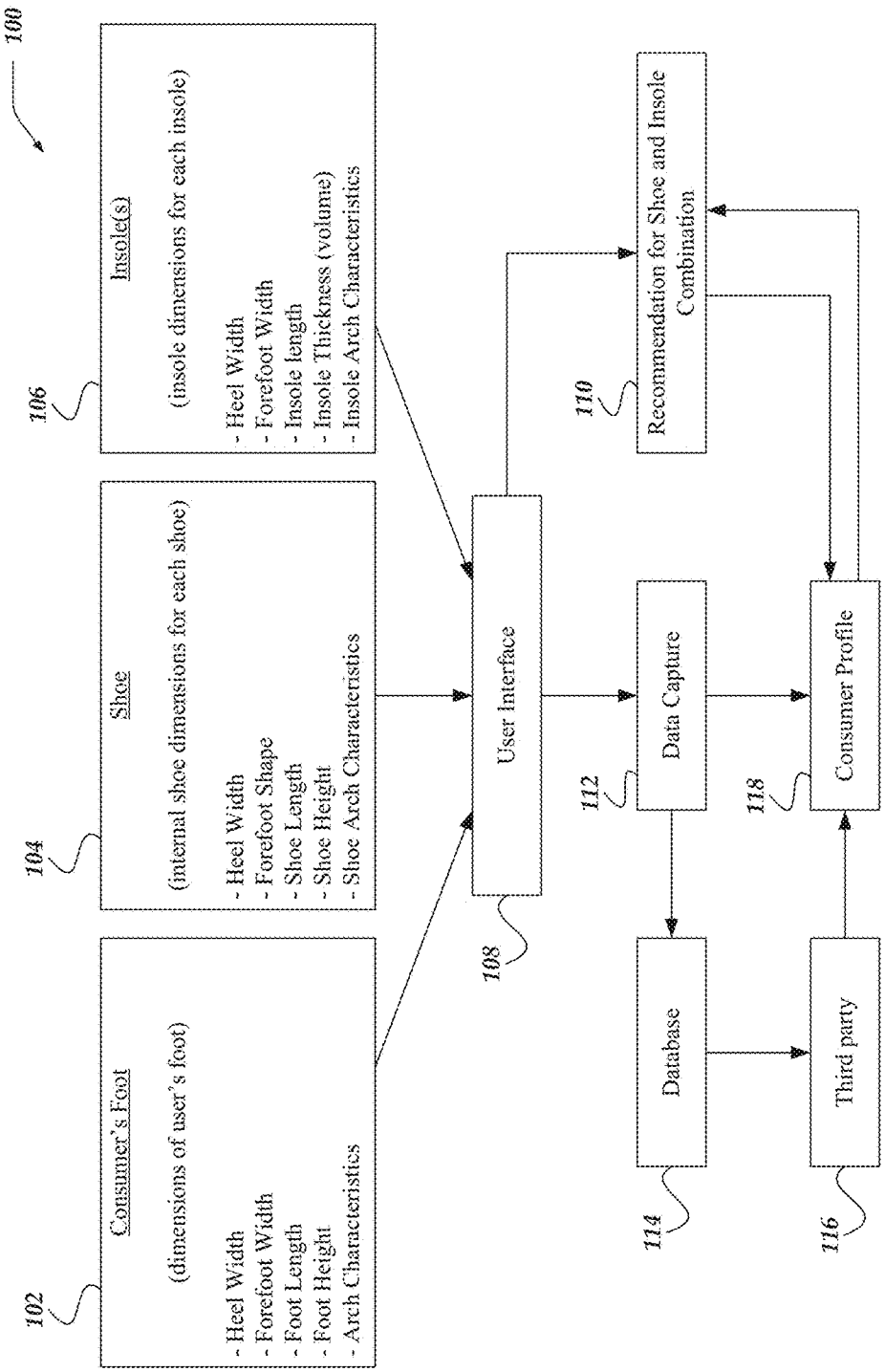
FIG. 1 illustrates a system diagram of a use-case embodiment for recommending shoes and insoles to a consumer.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "footwear" refers to articles to be worn on the feet of a consumer. Footwear may include, but is not limited to, shoes, boots, slippers, sandals, or the like. Similarly, footwear may include various types of footwear for a variety of different sporting or outdoor activities, including, but not limited to, running shoes, hiking shoes or boots, ski boots, snowboard boots, rock-climbing shoes, biking shoes, golfing shoes, track shoes/spikes, roller skates, ice skates, or the like. Although embodiments are generally described with reference to shoes, other types of footwear may also be utilized in embodiments described herein. A pair of shoes may include both an article of footwear for a left foot (i.e., a left-foot shoe) and an article of footwear for a right foot (i.e., a right-foot shoe). In this way, shoe recommendations can be determined based on an analysis of one or both of a consumer's feet.

As described herein, shoe information may be determined for a plurality of different shoes. Since shoes comes in all shapes and sizes, one shoe may be different or differentiated from another shoe by brand, style, size, materials, or the like, or a combination thereof. For example, shoe_A from brand_Z in size 10 may be different than shoe_A from brand_Z in size 6 just as it is different than shoe_B from brand_Z in size 10. Examples of shoe information may include, but is not limited to, heel width, forefoot shape, shoe length, shoe height, shoe arch characteristics, or the like, or any combination thereof.

As used herein, the term "insole" refers to an insert in footwear that is configured and arranged such that a bottom of the insole engages a sole of a shoe and a top of the insole engages a wearer's foot (with or without a sock). As described herein, insole information may be determined for a plurality of different insoles. Since insoles come in all shapes and sizes, one insole may be different or differentiated from another insole by brand, style, size, materials, or the like, or a combination thereof. For example, insole_M from brand_A in size 10 may be different than insole_M from brand_A in size 6 just as it is different than insole_S from brand_C in size 10. Examples of insole information may include, but is not limited to, heel width, forefoot width, insole length, insole thickness, insole arch characteristics, or the like, or any combination thereof.

As used herein, the term "consumer" refers to a person who is the target wearer of a particular combination of shoes and insoles. Embodiments described herein recommend one or more combinations of shoes and insoles that are compatible with the consumer's feet. Although many embodiments are described with reference to a foot of the consumer, many embodiments may also be performed for both feet of the consumer.

As used herein, a shoe, insole, or shoe/insole combination that is "compatible" with a consumer's foot refers to a shoe, insole, or combination thereof that provides anatomically correct support for the consumer's foot or is within a predetermined threshold or tolerance level. Looking at the very basic example of shoe size. For a shoe to be compatible with a consumer's foot, the internal length of a shoe should be longer than a length of the consumer's foot but be no more than tolerance threshold distance (e.g., five millimeters) longer than a length of the consumer's foot. So, a compatible shoe, insole, or shoe/insole combination may be referred to as a best possible fit for the consumer's foot. In some embodiments, a compatible shoe may take into account both a left-foot shoe and a right-foot shoe given that most shoes are sold as a pair. So, a compatible shoe, insole, or combination thereof may be an average of or a best compatibility between a left-foot shoe (and left foot) and a right-foot shoe (and right foot).

As used herein, the term "user" refers to a person employing the system described herein to recommend a shoe and/or insole combination for a consumer. In some embodiments, the user may be the consumer, such as if the consumer is purchasing shoes/insoles online. In other embodiments, the user may be a retail store worker who is employing the system described herein to fit a consumer with shoes and/or insoles. In yet other embodiments, the user may be a manager of the retail worker, where the manager may be employing the system described herein to grade and/or otherwise evaluate the worker's sole- and insole-combination recommendation for a consumer.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detail description this is presented later.

Briefly stated, embodiments are directed towards recommending a shoe and insole combination for a consumer. A variety of shoe information, insole information, and consumer foot information may be determined. The shoe information may include three-dimensional (3D) characteristics of an inside of each of a plurality of shoes. The insole information may include 3D characteristics of an exterior of each of the plurality of insoles. And the foot information may include 3D characteristics of a shape of the consumer's foot. In various embodiments, the foot information may be determined by employing image-recognition techniques on a plurality of two-dimensional or three-dimensional images captured of the consumer's foot. In at least one embodiment, a plurality of foot characteristics in the plurality of two-dimensional (or three-dimensional) images may be employed to generate the foot information.

The foot information, the shoe information for at least a portion of the plurality of shoes, and the insole information for at least a portion of the plurality of insoles may be compared to determine at least one combination of shoe and insole that is compatible with the consumer's foot. In various embodiments, the comparison may analyze a plurality of different metrics or measurements of the foot, shoe, and insole, including, but not limited to, heel width, a width or shape, a length, a height, arch characteristics, or the like. Based on this comparison of foot information, shoe information, and insole information, a recommendation of at least one shoe and insole combination may be determined and provided to a user and/or the consumer. In various embodiments, the recommendation may include a plurality of combinations of shoe and insole, where each combination includes a brand, style, and size of shoe and a brand, style, and size of insole.

In some embodiments, the user may be enabled to select a shoe for use in comparing shoe information, foot information, and insole information. In at least one such embodiment, the recommendation may be for an insole based on the comparison of the foot information, the shoe information for the selected shoe, and the insole information for at least the portion of the plurality of insoles. In other embodiments, the user may be enabled to select an insole for use in comparing shoe information, foot information, and insole information. In at least one such embodiment, the recommendation may be for a shoe based on the comparison of the foot information, the insole information for the selected insole, and the shoe information for at least the portion of the plurality of shoes.

Illustrative System Diagram

FIG. 1 illustrates a system diagram of a use-case embodiment for recommending shoes and insoles to a consumer. System 100 may include a consumer's foot information 102, shoe information 104 for a plurality of different shoes, and insole information 106 for a plurality of different insoles.

Foot information 102 may include a plurality of information or metrics regarding a consumer's foot. This foot information may include the consumer's heel width, the consumer's forefoot width, the consumer's foot length, the consumer's foot height, arch characteristics of the consumer's foot, or the like. The heel width may be a distance at a widest part of the consumer's heel. The forefoot width may be a distance at a widest part of the consumer's forefoot (typically proximal to the head of the metatarsals). The foot length may be a distance between the back of the consumer's heel and the tip of the consumer's longest toe, which may be referred to as the heel-to-toe length. The foot height may be a distance from the ground to a highest point on the top of the consumer's foot (typically proximal to the instep of the foot). The arch characteristics may include a plurality of different measurements and/or features of the medial longitudinal arch of the consumer's foot. For example, the arch characteristics may include width of the waist of the foot, a distance from the heel to the ball of the foot (e.g., a length of the arch), a distance from the ground to the highest peak of the arch (e.g., a height of the arch), a location of the highest peak of the arch relative to the heel, or the like. It should be recognized that various other foot information may also be utilized.

Shoe information 104 may include a plurality of information or metrics regarding an inside of a shoe. As described herein, shoe information may be collected for a plurality of different shoes, which may include different combinations of brands, styles, or sizes. Shoe information may include the heel width, the forefoot shape, the shoe length, the shoe height, arch characteristics of the shoe, or the like. The heel width may be a distance at a widest internal part of the heel of the shoe (e.g., a wall-to-wall distance of the shoe heel). The forefoot shape may include the width of the shoe forefoot, which may be a distance at a widest part of the shoe forefoot (e.g., a wall-to-wall distance of the shoe forefoot). The shoe length may be an internal distance between the back of the shoe heel and the toe tip of the shoe (e.g., a wall-to-wall distance between the heel and the tip of the toe of the shoe). The shoe height may include a volume of the shoe's interior and/or a distance from the sole of the shoe to a highest point on the top of the shoe (typically proximal to the instep of a wearer's foot). The arch characteristics may include a plurality of different measurements and/or features of the shoe proximal to where a wearer's medial longitudinal arch engages the shoe. For example, the arch characteristics may include a width of the waist of the shoe at the top of the sole (e.g., a wall-to-wall distance of the waist of the shoe), or the like. It should be recognized that various other shoe information may also be utilized such that a determination can be made whether a wearer's foot is compatible with a shoe, i.e., can the wearer's foot fit inside the shoe.

Insole information 106 may include a plurality of information or metrics regarding an exterior of an insole. As described herein, insole information may be collected for a plurality of different insoles, which may include different combinations of brands, styles, or sizes. Insole information may include the heel width, the forefoot shape, the insole length, the insole thickness (or volume), arch characteristics of the shoe, or the like. The heel width may be a distance at a widest part of the heel of the insole. The forefoot shape may include the width of the insole at the forefoot, which may be a distance at a widest part of the insole forefoot. The insole length may be a distance between the back of the heel and the front of the insole. The insole thickness may include a volume of the insole interior and/or a distance from the bottom of the insole to a thickest point on the top of the insole (typically proximal to the instep of a wearer's foot). The arch characteristics may include a plurality of different measurements and/or features of the insole proximal to where a wearer's medial longitudinal arch engages the insole. For example, the arch characteristics may include a width of the waist of the insole, a distance from the heel to the ball of the foot (e.g., a length of the arch), a distance from the ground to the highest peak of the arch (e.g., a height of the arch), a location of the highest peak of the arch relative to the heel, or the like. It should be recognized that various other insole information may also be utilized such that a determination can be made whether a wearer's foot plus the insole is compatible with a shoe, i.e., can the wearer's foot plus the insole fit inside the shoe and does the insole provide anatomical support for the wearer's foot.

User interface 108 may be a graphical user interface where the consumer's foot information 102, shoe information 104, and insole information 106 may be compared. In some embodiments, user interface 108 may be a website, such as an online retail store that sells shoes. In other embodiments, user interface 108 may be an application on a client computer (e.g., client computer 400 of FIG. 4). In yet other embodiments, user interface 108 may be employed by a kiosk or other system that can be utilized by a brick-and-mortar retail store.

User interface 108 may generate recommendation 110 based on the comparison of foot information 102, shoe information 104, and insole information 106. In some embodiments, user interface 108 may score or otherwise rank shoe/insole combinations in how compatible each combination is with the consumer's foot. In various embodiments, recommendation 110 may include an ordered list of shoe/insole combinations based on the scores of how compatible they are with the consumer's foot. In some embodiments, user interface 108 may enable a user to select an insole or a shoe, such that recommendations 110 may include a list of shoes or insoles that when combined with the selected insole or shoe are a best possible fit for the consumer's foot.

In some embodiments, the foot information, shoe information, and insole information may be captured 112 and stored in database 114. In various embodiments, information from database 114 may be sold or otherwise provided to third parties 116. Third parties 116 may utilize the database information for a variety of different footwear-related purposes. For example, in some embodiments, third party 116 may utilize the information to characterize a particular population or demographic and the shoe. This characterization may be employed to develop new footwear products, including new shoes and/or insoles, or to provide footwear advertisements to consumers. In some embodiments, the third party 116 may provide other information, product descriptions, advertisements, or the like to the consumer (i.e., consumer profile 118). In this way, the consumer may be informed of new products (shoes, insoles, or a combination thereof) that are compatible with their feet.

In some embodiments, recommendation 110 may be stored in consumer profile 118. In this way, the consumer may quickly obtain other recommended combinations of shoes and insoles. In other embodiments, data captured 112 may also be stored in consumer profile 118. In some embodiments, the consumer's foot information may be stored in the consumer's profile. This information may be accessible to the user (or the user enabled to use the information) for future use in determining other recommendations of shoes and insoles. So, the user may not need to rescan their foot each time they use the system to recommend shoes and/or insoles.

General Operation

The operation of certain aspects of the invention will now be described with respect to FIGS. 2-3. In at least one of various embodiments, processes 200 or 300 of FIGS. 2-3, respectively, may be implemented by and/or executed on one or more computers or combinations of computers, such as client computer 500 of FIG. 5 and/or server computer 600 of FIG. 6. Additionally, various embodiments described herein can be implemented in a system such as system 400 of FIG. 4.

Figure 2:
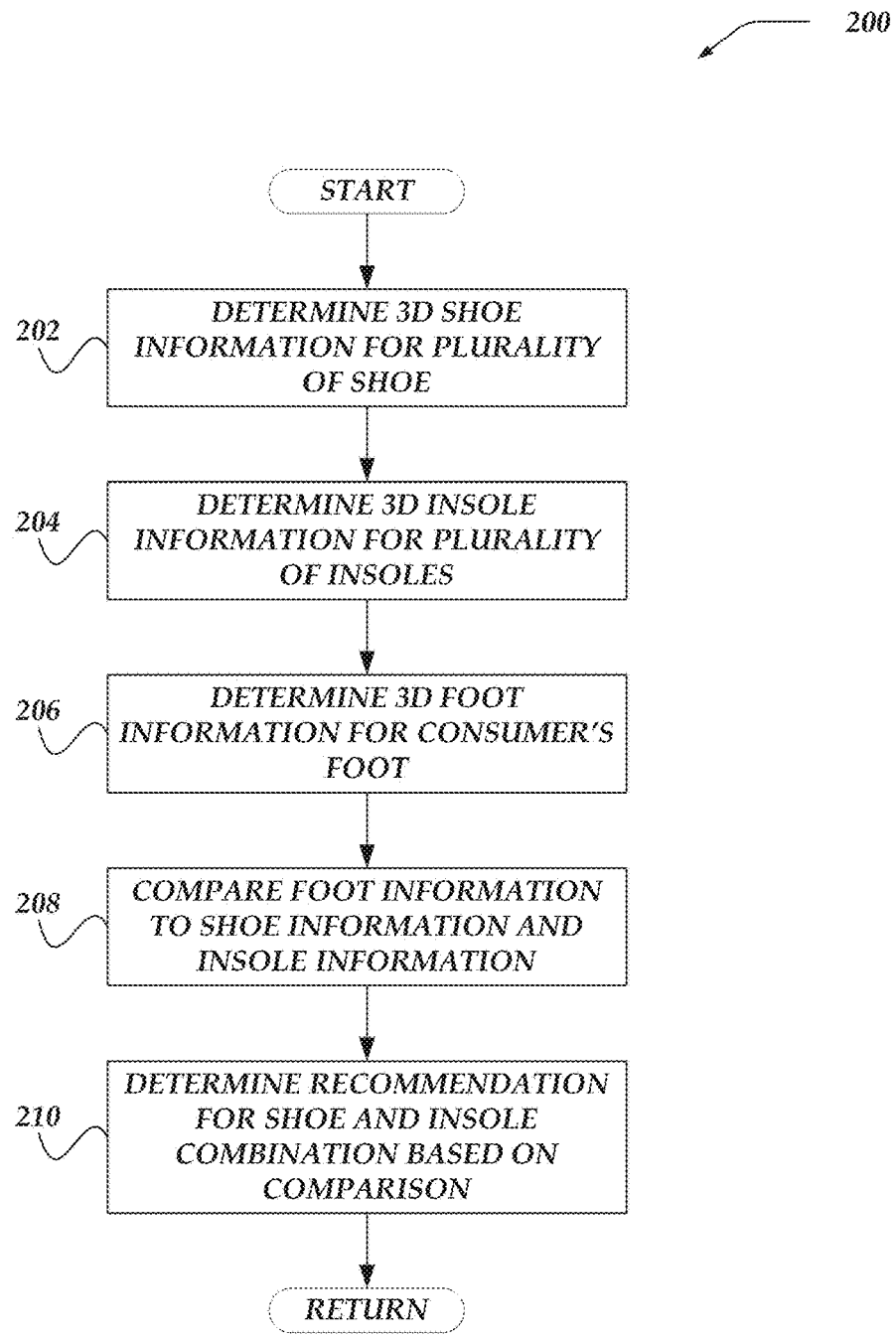
FIG. 2 illustrates a logical flow diagram generally showing one embodiment of an overview process for recommending shoes and insole combination for a consumer.

FIG. 2 illustrates a logical flow diagram generally showing one embodiment of an overview process for recommending shoe and insole combination for a consumer. Process 200 may begin, after a start block, at block 202, where three-dimensional (3D) shoe information may be determined for a plurality of shoes. In various embodiments, the 3D shoe information may include similar shoe information to that which is described above in conjunction with shoe information 104 of FIG. 1. It should be recognized, however, that other shoe information or combinations of shoe information may also be determined.

In various embodiments, the interior of each of the plurality of shoes may be scanned to obtain the 3D shoe information. In other embodiments, lasts of the shoe's interior may be obtained, which may be used to determine and/or measure the shoe information (e.g., by 3D scanning). In yet other embodiments, computer-aided design (CAD) drawings or other design schematics or illustrations of shoes may be utilized to obtain/determine the 3D shoe information.

In various embodiments, the 3D shoe information may be provided by a manufacturer with each shoe that it sells, e.g., size, style, left/right, or the like. In other embodiments, the 3D shoe information may be obtained by a retailer scanning each different shoe that it carries and/or sells. In yet other embodiments, a third party may determine 3D shoe information for each of a plurality of different brands, styles, sizes, or the like.

It should be recognized that shoe information for a plurality of shoes may be determined and/or otherwise obtained by a variety of different methods and/or combinations of methods. Also, it should be understood that shoe information may be obtained for both left-foot shoes and right-foot shoes for each pair of shoes.

Process 200 may proceed to block 204, where 3D insole information may be determined for a plurality of insoles. In various embodiments, the 3D insole information may include similar insole information to that which is described above in conjunction with insole information 106 of FIG. 1. It should be recognized, however, that other insole information or combinations of insole information may also be determined.

In various embodiments, each of the plurality of insoles may be scanned to obtain the 3D insole information. In other embodiments, CAD drawings or other design schematics or illustrations of insoles may be utilized to obtain/determine the insole information.

In various embodiments, the 3D insole information may be provided by a manufacturer with each insole that it sells. In other embodiments, the 3D insole information may be obtained by a retailer scanning each different insole that it carries and/or sells. In yet other embodiments, a third party may determine 3D insole information for insoles from a plurality of different brands, styles, sizes, or the like.

It should be recognized that insole information for a plurality of insoles may be determined and/or otherwise obtained by a variety of different methods and/or combinations of methods. Also, it should be understood that insole information may be obtained for insoles that fit into both left-foot shoes and right-foot shoes.

Process 200 may continue at block 206, where 3D foot information may be determined for a consumer's foot. In various embodiments, the 3D foot information may include similar foot information to that which is described above in conjunction with foot information 102 of FIG. 1. It should be recognized, however, that other foot information or combinations of foot information may also be determined.

In some embodiments, the 3D foot information may be obtained by a 3D scanner. For example, a retail store may have a 3D scanner that can scan customers' feet. In another example, a kiosk (e.g., at a tradeshow or in a drug store) may include a 3D scanner that is can scan a consumer's foot to determine and/or otherwise obtain the 3D foot information. In this example, the kiosk may recommend an insole, by employing embodiments described herein, for a current pair of shoes that the consumer is wearing. Or the kiosk may provide the consumer with the 3D foot information, such that the consumer can use the 3D foot information later to get a recommendation for shoes and/or insoles, as described herein.

In other embodiments, 2D or 3D images of the consumer's foot may be utilized to determine the 3D foot information. For example, the consumer may utilize a smartphone (e.g., client computer 400 of FIG. 4) to capture 2D or 3D images of their foot. The images may be uploaded to a kiosk (e.g., as described above), to a website that can recommend shoes/insoles, to an online retailer that can also recommend shoes/insoles, or other user interface (e.g., user interface 108 of FIG. 1). In at least one such some embodiment, the consumer's smartphone may include an app that instructs the consumer to take photos of their foot. For example, the app may instruct the consumer to take images of a medial side of their foot, the top of their foot, and the bottom of their foot. In some other embodiments, a worker of a retail store (or other user of the system) may also utilize a smartphone to capture 2D or 3D images that can be employed to determine the 3D foot information. In various embodiments, foot-recognition algorithms may be utilized to determine the various different measurements and/or shapes for the 3D foot information.

In yet other embodiments, the 3D foot information may be determined by a user measuring various aspects of the consumer's foot and providing them to the recommendation system.

In any event, process 200 may proceed next to block 208, which is described in more detail below in conjunction with FIG. 3. Briefly, however, the foot information, the shoe information, and the insole information may be compared to determine various combinations of shoes and insoles that are compatible with the consumer's foot.

Process 200 may continue next at block 210, where one or more recommendations of footwear and insole combinations may be determined and provided to the consumer. In various embodiments, each recommendation may include a footwear and an insole. In at least one of various embodiments, the recommendation may include a score that indicates how compatible the footwear/insole combination is with the consumer's foot. This score may be determined based on a tolerance level or distance between the various foot information, footwear information, and insole information.

In some embodiments, the user may preselect footwear, so that the recommendation is for one or more insoles that are compatible with the consumer's foot and the selected footwear. Similarly, the recommendation may include other footwear (and insole) that may be more compatible with consumer's foot than the preselected footwear. For example, the recommendation may be for a different size of the preselected footwear or a different style/brand of footwear.

In other embodiments, the user may preselect an insole, so that the recommendation is for one or more footwear that are compatible with the consumer's foot and the selected insole. Similarly, the recommendation may include other insoles (and footwear) that may be more compatible with consumer's foot than the preselected insole. For example, the recommendation may be for an insole with different arch characteristics than the preselected insole.

In various other embodiments, the user may preselect both the insole and the footwear, and the recommendation may include a score for how compatible the combination of the preselected insole and footwear are with the consumer's foot. In at least one of the various embodiments, such a recommendation also may include an insole that would be more compatible with the preselected footwear and the consumer's foot (when compared to combined preselected insole and preselected footwear), or footwear that would be more compatible with the preselected insole and the consumer's foot (when compared to combined preselected insole and preselected footwear), or other combinations of non-selected footwear and non-selected insoles that may be more compatible with the consumer's foot (when compared to combined preselected insole and preselected footwear).

In some other embodiments, a custom shoe and/or insole may be generated based on the comparison at block 208. For example, a 3D printer may be employed to create an insole that in combination with a shoe may be compatible with the consumer's foot.

After block 210, process 200 may terminate and/or return to a calling process to perform other actions.

It should be recognized that many consumers may purchase a pair of shoes and a pair of insoles. So, various embodiments described herein may be employed for a single foot or concurrently for both feet. For example, in some embodiments, process 200 may be employed concurrently for both feet. In at least one such embodiment, the recommended shoe/insole combination may be based on an average compatibility score between the foot and the right foot. In yet other embodiments, process 200 may be employed separately for each of a consumer's feet. So, in at least one of the various embodiment, a recommendation list of shoe/insole combinations may be determined for a consumer's left foot and a separate recommendation list of shoe/insole combinations may be determined for a consumer's right foot. These two lists may be compared such that shoe/insole combinations that are common to both lists may be provided to the consumer. In this way, the consumer can purchase a pair of shoes and a pair of insoles.

Although embodiments described herein are with reference to shoes and footwear, embodiments are no so limited and other articles of clothing or combinations thereof may also be determined and recommended to a consumer. For example, gloves and/or glove liners may be recommended for a consumer's hands based on hand information, glove information, and liner information. Although the metrics that are used to compare other articles of clothing and consumer body parts may be different than what is used for shoes and insoles, the embodiments described herein may be employed for other articles of clothing.

Figure 3:
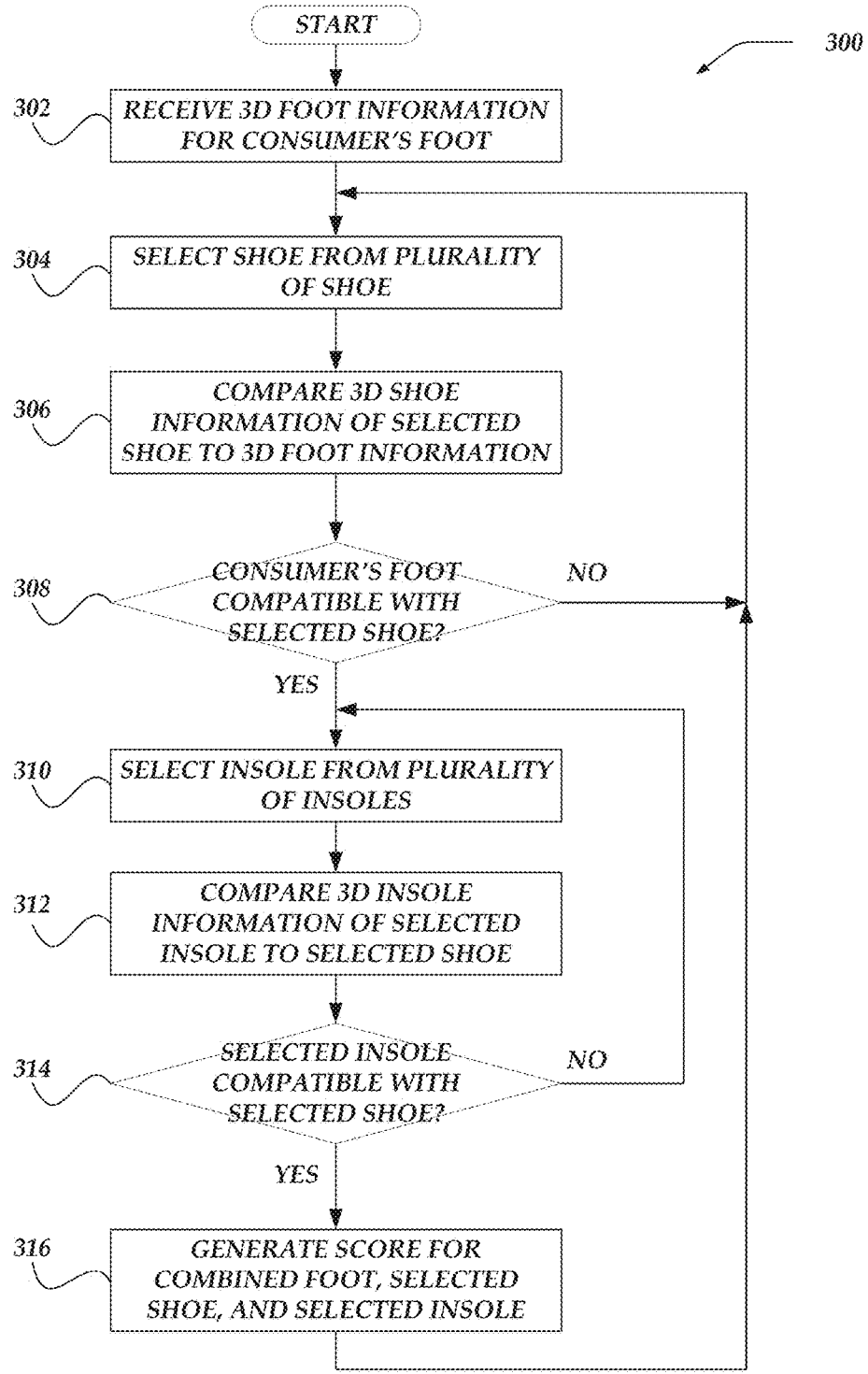
FIG. 3 illustrates a logical flow diagram generally showing one embodiment of a process for comparing a consumer's foot information, shoe information, and insole information to determine a shoe and insole combination to recommend to the consumer.

FIG. 3 illustrates a logical flow diagram generally showing one embodiment of a process for comparing a consumer's foot information, shoe information, and insole information to determine a shoe and insole combination to recommend to the consumer. Process 300 may begin, after a start block, at block 302, where 3D foot information may be received for a consumer's foot. In various embodiments, block 302 may employ embodiments of block 206 of FIG. 2 to obtain a consumer's foot information.

Process 300 may proceed to block 304, where a shoe may be selected. In various embodiments, the shoe may be selected from a plurality of shoe. In at least one of various embodiments, the plurality of shoes may include shoes that are for the same foot side as the 3D foot information. If the foot information includes information for both feet, then the selected shoe may be a pair of shoes with a left-foot shoe and a corresponding right-foot shoe.

In some embodiments, the plurality of shoe may be a set of shoes that a retailer sells, shoes that are appealing to the consumer, shoes that match an activity or purpose of the shoe (e.g., hiking, skiing, or the like), shoes that are designed for the gender or demographic of the consumer, or the like. In various other embodiments, the selected shoe may be selected by the user as a possible shoe that they would like to purchase.

Process 300 may proceed to block 306, where 3D shoe information of the selected shoe may be compared to the 3D foot information of the consumer's foot. In various embodiments, this comparison may include individual comparisons of a plurality of metrics from the 3D shoe information and the 3D foot information. For example, one comparison metric may be between the consumer's foot length and the internal length of the shoe. Another example may be arch characteristics of the consumer's foot compared to arch characteristics of the shoe. And so on.

In various embodiments, the comparisons of each metric may provide a value that indicates the difference between the various comparisons. For example, if the consumer's foot is longer than the shoe's internal length, then a negative value may result, indicating that the consumer's foot is too long for the selected shoe. In contrast, if the consumer's foot is shorter than the shoe's internal length, then a positive value may result, indicating that the consumer's foot is short enough to fit into the selected shoe.

In some embodiments, a result from the comparison of a metric (e.g., foot length compared to internal shoe length) may itself be compared to a threshold or tolerance level. If the result is within a predetermined threshold value, then the metric may be considered compatible. This additional threshold comparison may be used to determine how close the consumer's foot fits into the selected shoe, or if the consumer's foot is close enough to be compatible with the selected shoe. For example, a size 14 shoe may be determined to be incompatible with a consumer's foot that should be a size 9.

Process 300 may continue at decision block 308, where a determination may be made whether the consumer's foot is compatible with the selected shoe. In various embodiments, the shoe and consumer's foot may be compatible if the combination of each metric compared in block 306 is determined to be compatible (i.e., within some tolerance threshold value). If the consumer's foot is compatible with the selected footwear, then process 300 may flow to block 310; otherwise, process 300 may loop to block 304 to select another footwear for comparison.

At block 310, an insole may be selected from a plurality of insoles. In some embodiments, the plurality of insoles may be a set of insoles that the retailer sells, insoles that match an activity or purpose of the shoe and insole (e.g., hiking, skiing, or the like), insoles that are designed for the gender or demographic of the consumer, or the like. In various other embodiments, the selected insole may be selected by the user as a possible insole that they would like to purchase.

Process 300 may then proceed to block 312, where the 3D insole information may be compared with the selected shoe. In various embodiments, block 312 may employ embodiments of block 306 to compare insole information and shoe information. In various embodiments, the same metrics utilized for comparison in block 306 may also be utilized at block 312.

Process 300 may continue at decision block 314, where a determination may be made whether the selected insole is compatible with the selected footwear. Similar to decision block 308, the selected shoe and selected insole may be compatible if the combination of each metric compared in block 312 is determined to be compatible (i.e., within some tolerance threshold value). If the selected insole is compatible with the selected shoe, then process 300 may flow to block 316; otherwise, process 300 may loop to block 310 to select another insole for comparison with the selected shoe.

At block 316, a score may be generated for the combined consumer's foot, the selected shoe, and the selected insole. In various embodiments, this score may be based on the difference between each compared metric in both block 306 and block 312. In some embodiments, the greater the difference between compared values, the lower the score—because the shoe and/or insole is too large for the consumer's foot. In other embodiments, the smaller the difference between compared values, the higher the score—because the shoe and insole are a closer fit with the consumer's foot. However, if the differences between compared values is too small, then the shoe and insole may be too tight on the consumer's foot. So, in various other embodiments, the compatibility score may be determined on a bell curve.

After block 316, process 300 may loop to block 304 to select another shoe for comparison with the consumer's foot. In various embodiments, process 300 may continue until each of the plurality of shoe have been selected and compared to the consumer's foot, and that each of the plurality of insoles is selected and compared to each of the plurality of shoe. In this way, each combination of consumer's foot, shoe, and insole may be compared and a score may be determined for each combination where the consumer's foot is compatible with both a shoe in combination with an insole. In some embodiments, this score may be employed to provide the recommendation of shoe and insole to the consumer (e.g., at block 210 of FIG. 2). For example, the top ten scoring combinations may be recommended and provided to the consumer.

It should be understood that the embodiments described in the various flowcharts may be executed in parallel, in series, or a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Further, the embodiments described herein and shown in the various flowcharts may be implemented as entirely hardware embodiments (e.g., special-purpose hardware), entirely software embodiments (e.g., processor-readable instructions), or a combination thereof. In some embodiments, software embodiments can include multiple processes or threads, launched statically or dynamically as needed, or the like.

The embodiments described herein and shown in the various flowcharts may be implemented by computer instructions (or processor-readable instructions). These computer instructions may be provided to one or more processors to produce a machine, such that execution of the instructions on the processor causes a series of operational steps to be performed to create a means for implementing the embodiments described herein and/or shown in the flowcharts. In some embodiments, these computer instructions may be stored on machine-readable storage media, such as processor-readable non-transitory storage media.

Illustrative Operating Environment

Figure 4:
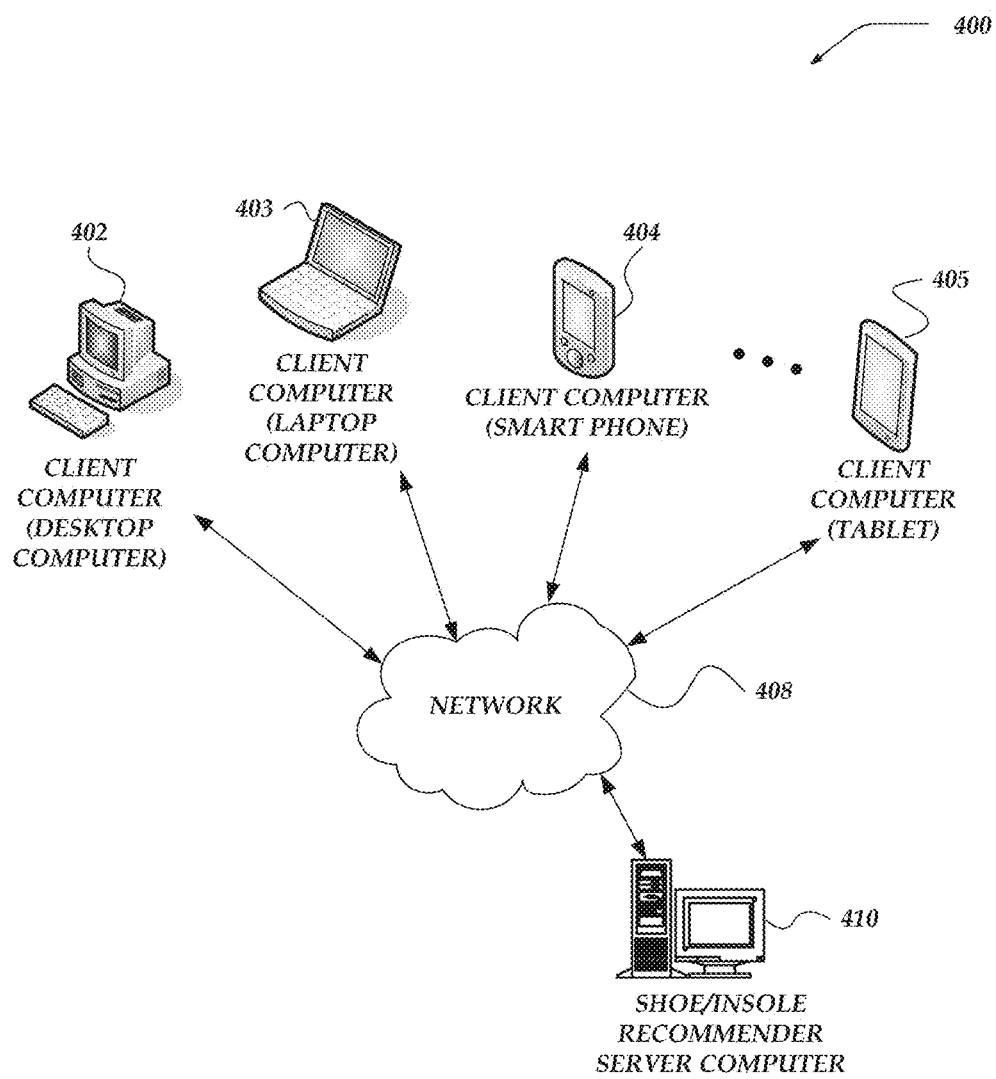
FIG. 4 is a system diagram of an environment in which embodiments of the invention may be implemented.

FIG. 4 shows components of one embodiment of an environment in which various embodiments of the invention may be practiced. Not all of the components may be required to practice the various embodiments, and variations in the arrangement and type of the components may be made without departing from the spirit or scope of the invention. As shown, system 400 of FIG. 4 may include shoe/insole recommender server computer 410, client computers 402-405, and network 408.

At least one embodiment of client computers 402-405 is described in more detail below in conjunction with client computer 500 of FIG. 5. Briefly, in some embodiments, client computers 402-405 may be configured to communicate with shoe/insole recommender server computer 410, and/or other network computers. In various embodiments, client computers 402-405 may be configured to determine consumer's foot information (e.g., by capturing images of the consumer's feet), determine one or more sole and insole combinations that are compatible with the consumer's feet, and provide at least one recommendation to the consumer. In other embodiments, client computers 402-405 may receive shoe/insole recommendations from shoe/insole recommender server computer 410.

In some embodiments, at least some of client computers 402-405 may operate over a wired and/or wireless network to communicate with other client computers, computing devices, or shoe/insole recommender server computer 410. Generally, client computers 402-405 may include computing devices capable of communicating over a network to send and/or receive information, perform various online and/or offline activities, or the like. It should be recognized that embodiments described herein are not constrained by the number or type of client computers employed, and more or fewer client computers—and/or types of client computers—than what is illustrated in FIG. 4 may be employed.

Devices that may operate as client computers 402-405 may include various computing devices that typically connect to a network or other computing device using a wired and/or wireless communications medium. Client computers 403-405 may be mobile devices and may include portable computers, and client computer 402 may include non-portable computers. Examples of client computer 402 may include, but are not limited to, desktop computers, personal computers, multiprocessor systems, microprocessor-based or programmable electronic devices, network PCs, or the like, or integrated devices combining functionality of one or more of the preceding devices. Examples of client computers 403-405 may include, but are not limited to, laptop computers (e.g., client computer 403), smart phones (e.g., client computer 404), tablet computers (e.g., client computer 405), cellular telephones, display pagers, Personal Digital Assistants (PDAs), handheld computers, wearable computing devices, or the like, or integrated devices combining functionality of one or more of the preceding devices. In yet other embodiments, client computers 402-405 may include kiosks or other computers that can recommend shoe/insoles for a consumer. As such, client computers 402-405 may include computers with a wide range of capabilities and features.

Client computers 402-405 may access and/or employ various computing applications to enable users to perform various online and/or offline activities. Such activities may include, but are not limited to, generating documents, gathering/monitoring data, capturing/manipulating images, managing media, managing financial information, playing games, managing personal information, browsing the Internet, or the like. In some embodiments, client computers 402-405 may be enabled to connect to a network through a browser, or other web-based application.

Client computers 402-405 may further be configured to provide information that identifies the client computer. Such identifying information may include, but is not limited to, a type, capability, configuration, name, or the like, of the client computer. In at least one embodiment, a client computer may uniquely identify itself through any of a variety of mechanisms, such as an Internet Protocol (IP) address, phone number, Mobile Identification Number (MIN), media access control (MAC) address, electronic serial number (ESN), or other device identifier.

At least one embodiment of shoe/insole recommender server computer 410 is described in more detail below in conjunction with server computer 600 of FIG. 6. Briefly, in some embodiments, shoe/insole recommender server computer 410 may be operative to determine one or more sole and insole combinations that are compatible with the consumer's feet based on a comparison with shoe information, insole information, and foot information. Shoe/insole recommender server computer 410 may be a server computer for a website (e.g., an online shoe retailer), a kiosk or standalone computer that can recommend shoes/insoles, or the like.

Network 408 may include virtually any wired and/or wireless technology for communicating with a remote device, such as, but not limited to, USB cable, BLUETOOTH, Wi-Fi, or the like. In some embodiments, network 408 may be a network configured to couple network computers with other computing devices, including client computers 402-405, shoe/insole recommender server computer 410, or the like. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or any combination thereof. In various embodiments, the network may be enabled to employ various forms of communication technology, topology, computer-readable media, or the like, for communicating information from one electronic device to another. For example, the network can include—in addition to the Internet—LANs, WANs, Personal Area Networks (PANs), Campus Area Networks, Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, the network may include any communication technology by which information may travel between computing devices.

The network may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least client computers 402-405 (or other mobile devices). Such sub-networks may include mesh networks, Wireless LAN (WLAN) networks, cellular networks, or the like. In at least one of the various embodiments, the system may include more than one wireless network.

The network may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), orthogonal frequency-division multiplexing (OFDM), ultra wide band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-time Transport Protocol (SIP/RTP), Short Message Service (SMS), Multimedia Messaging Service (MMS), or any of a variety of other communication protocols and/or technologies. In essence, the network may include communication technologies by which information may travel between client computers 402-405, shoe/insole recommender server computer 410, other computing devices not illustrated, other networks, or the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

Illustrative Client Computer

Figure 5:
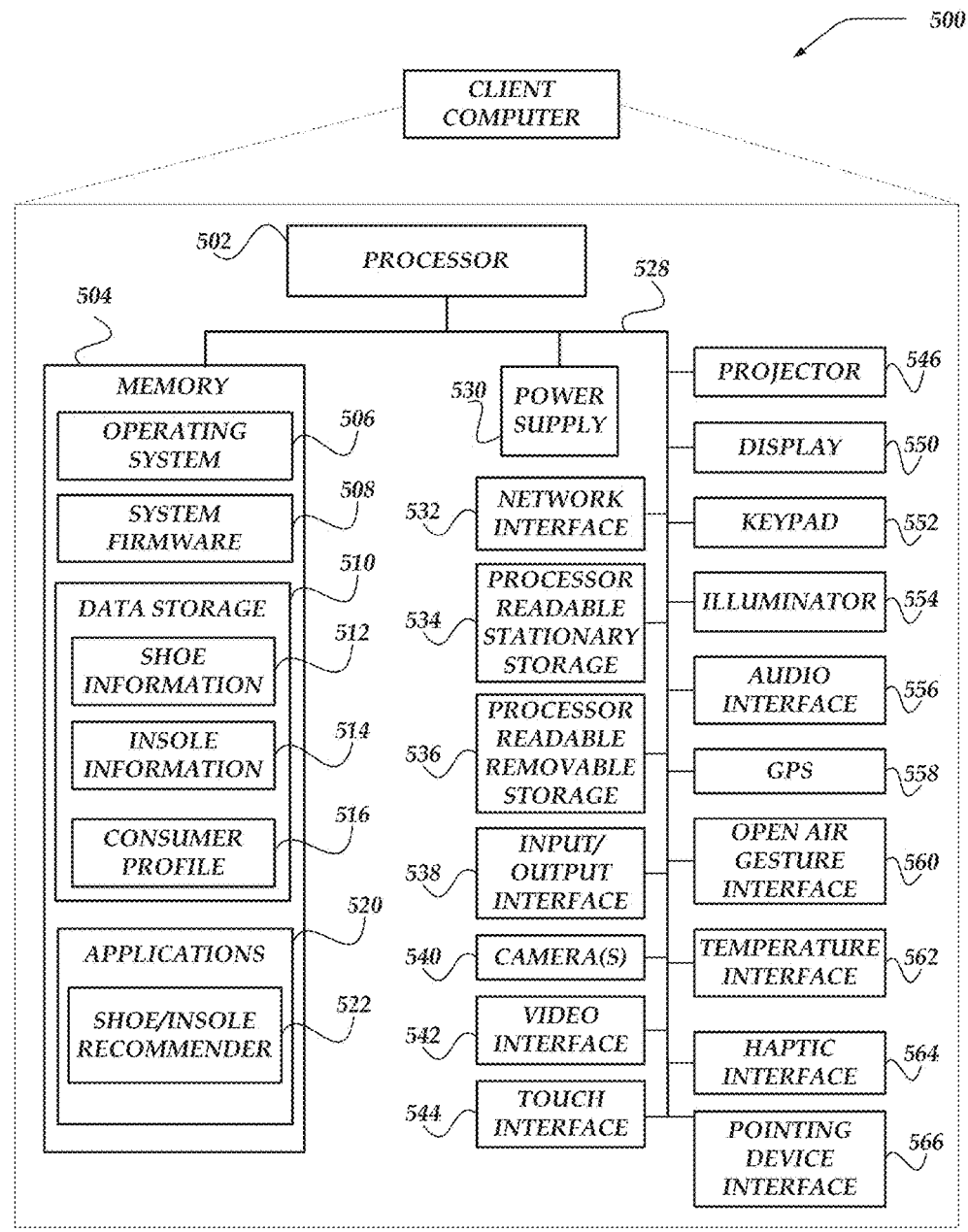
FIG. 5 shows an embodiment of a client computer that may be included in a system such as that shown in FIG. 4.

FIG. 5 shows one embodiment of client 500 that may include many more or less components than those shown. Client computer 500 may represent, for example, at least one embodiment of client computers 402-405 shown in FIG. 4. So, client computer 500 may be a mobile device (e.g., a smart phone or tablet), a stationary/desktop computer, or the like.

Client computer 500 may include processor 502 in communication with memory 504 via bus 528. Client computer 500 may also include power supply 530, network interface 532, processor-readable stationary storage device 534, processor-readable removable storage device 536, input/output interface 538, camera(s) 540, video interface 542, touch interface 544, projector 546, display 550, keypad 552, illuminator 554, audio interface 556, global positioning systems (GPS) receiver 558, open air gesture interface 560, temperature interface 562, haptic interface 564, pointing device interface 566, or the like. Client computer 500 may optionally communicate with a base station (not shown), or directly with another computer. And in one embodiment, although not shown, an accelerometer or gyroscope may be employed within client computer 500 for measuring and/or maintaining an orientation of client computer 500.

Power supply 530 may provide power to client computer 500. A rechargeable or non-rechargeable battery may be used to provide power. The power may also be provided by an external power source, such as an AC adapter or a powered docking cradle that supplements and/or recharges the battery.

Network interface 532 includes circuitry for coupling client computer 500 to one or more networks, and is constructed for use with one or more communication protocols and technologies including, but not limited to, protocols and technologies that implement any portion of the OSI model, GSM, CDMA, TDMA, UDP, TCP/IP, SMS, MMS, GPRS, WAP, UWB, WiMax, SIP/RTP, GPRS, EDGE, WCDMA, LTE, UMTS, OFDM, CDMA2000, Ev-DO, HSDPA, or any of a variety of other wireless communication protocols. Network interface 532 is sometimes known as a transceiver, transceiving device, or network interface card (NIC).

Audio interface 556 may be arranged to produce and receive audio signals such as the sound of a human voice. For example, audio interface 556 may be coupled to a speaker and microphone (not shown) to enable telecommunication with others and/or generate an audio acknowledgement for some action. A microphone in audio interface 556 can also be used for input to or control of client computer 500, e.g., using voice recognition, detecting touch based on sound, and the like.

Display 550 may be a liquid crystal display (LCD), gas plasma, electronic ink, light-emitting diode (LED), Organic LED (OLED), or any other type of light reflective or light transmissive display that can be used with a computer. Display 550 may also include a touch interface 544 arranged to receive input from an object such as a stylus or a digit from a human hand, and may use resistive, capacitive, surface acoustic wave (SAW), infrared, radar, or other technologies to sense touch and/or gestures.

Projector 546 may be a remote handheld projector or an integrated projector that is capable of projecting an image on a remote wall or any other reflective object such as a remote screen.

Video interface 542 may be arranged to capture video images, such as a still photo, a video segment, an infrared video, or the like. For example, video interface 542 may be coupled to a digital video camera, a web-camera, or the like. Video interface 542 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 552 may comprise any input device arranged to receive input from a user. For example, keypad 552 may include a push button numeric dial, or a keyboard. Keypad 552 may also include command buttons that are associated with selecting and sending images.

Illuminator 554 may provide a status indication and/or provide light. Illuminator 554 may remain active for specific periods of time or in response to events. For example, when illuminator 554 is active, it may backlight the buttons on keypad 552 and stay on while the mobile device is powered. Also, illuminator 554 may backlight these buttons in various patterns when particular actions are performed, such as dialing another mobile computer. Illuminator 554 may also cause light sources positioned within a transparent or translucent case of the mobile device to illuminate in response to actions.

Client computer 500 may also comprise input/output interface 538 for communicating with external peripheral devices or other computers such as other mobile computers and network computers. Input/output interface 538 may enable client computer 500 to communicate with one or more servers, such as shoe/insole recommender server computer 410 of FIG. 4. Other peripheral devices that client computer 500 may communicate with may include remote speakers and/or microphones, headphones, display screen glasses, or the like. Input/output interface 538 can utilize one or more technologies, such as Universal Serial Bus (USB), Infrared, Wi-Fi, WiMax, Bluetooth™, wired technologies, or the like.

Haptic interface 564 may be arranged to provide tactile feedback to a user of a client computer. For example, the haptic interface 564 may be employed to vibrate client computer 500 in a particular way when another user of a computer is calling. Temperature interface 562 may be used to provide a temperature measurement input and/or a temperature changing output to a user of client computer 500. Open air gesture interface 560 may sense physical gestures of a user of client computer 500, for example, by using single or stereo video cameras, radar, a gyroscopic sensor inside a computer held or worn by the user, or the like. Camera 540 may be used to track physical eye movements of a user of client computer 500.

GPS transceiver 558 can determine the physical coordinates of client computer 500 on the surface of the Earth, which typically outputs a location as latitude and longitude values. GPS transceiver 558 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile device 500 on the surface of the Earth. It is understood that under different conditions, GPS transceiver 558 can determine a physical location for mobile device 500. In at least one embodiment, however, client computer 500 may, through other components, provide other information that may be employed to determine a physical location of the mobile computer, including for example, a Media Access Control (MAC) address, IP address, and the like.

Human interface components can be peripheral devices that are physically separate from client computer 500, allowing for remote input and/or output to client computer 500. For example, information routed as described here through human interface components such as display 550 or keyboard 552 can instead be routed through network interface 532 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as BLUETOOTH, ZIGBEE, and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A client computer may include a browser application that is configured to receive and to send web pages, web-based messages, graphics, text, multimedia, and the like. In various embodiments, the browser application may be configured to enable a user to communicate with other users, such as through a chat session on a web page. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 504 may include RAM, ROM, and/or other types of memory. Memory 504 illustrates an example of computer-readable storage media (devices) for storage of information such as computer-readable instructions, data structures, program modules, or other data. Memory 504 may store system firmware 508 (e.g., BIOS) for controlling low-level operation of client computer 500. The memory may also store operating system 506 for controlling the operation of client computer 500. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 504 may further include one or more data storage 510, which can be utilized by client computer 500 to store, among other things, applications 520 and/or other data. For example, data storage 510 may also be employed to store information that describes various capabilities of client computer 500. The information may then be provided to another device or computer based on any of a variety of events, including being sent as part of a header during a communication, sent upon request, or the like. Data storage 510 may also be employed to store social networking information including address books, buddy lists, aliases, user profile information, or the like. Data storage 510 may further include program code, data, algorithms, and the like, for use by a processor, such as processor 502 to execute and perform actions. In one embodiment, at least some of data storage 510 might also be stored on another component of client computer 500, including, but not limited to, non-transitory processor-readable removable storage device 536, processor-readable stationary storage device 534, or even external to the mobile device.

Data storage 510 may also store shoe information 512, insole information 514, and consumer profile 516. Shoe information 512 may include a plurality information regarding a plurality of shoes (e.g., shoe information 104 of FIG. 1). Insole information 514 may include a plurality information regarding a plurality of insoles (e.g., insole information 106 of FIG. 1). Consumer profile 516 may include a plurality information regarding the consumer, which may include, for example, the consumer's foot information (e.g., foot information 102 of FIG. 1), advertisements or other products that may be compatible with the consumer's feet, previously recommended shoe/insole combinations, or the like.

Applications 520 may include computer executable instructions which, when executed by client computer 500, transmit, receive, and/or otherwise process instructions and data. Examples of application programs include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Applications 520 may also include shoe/insole recommender 522, which may be configured to compare shoe information 512, insole information 514, and the consumer's foot information to determine one or more combinations of shoes and insoles that are compatible with the consumer's feet. So, in some embodiments, client computer 500 may be enabled to employ various embodiments, combinations of embodiments, processes, or parts of processes, as described herein.

Illustrative Server Computer

Figure 6:
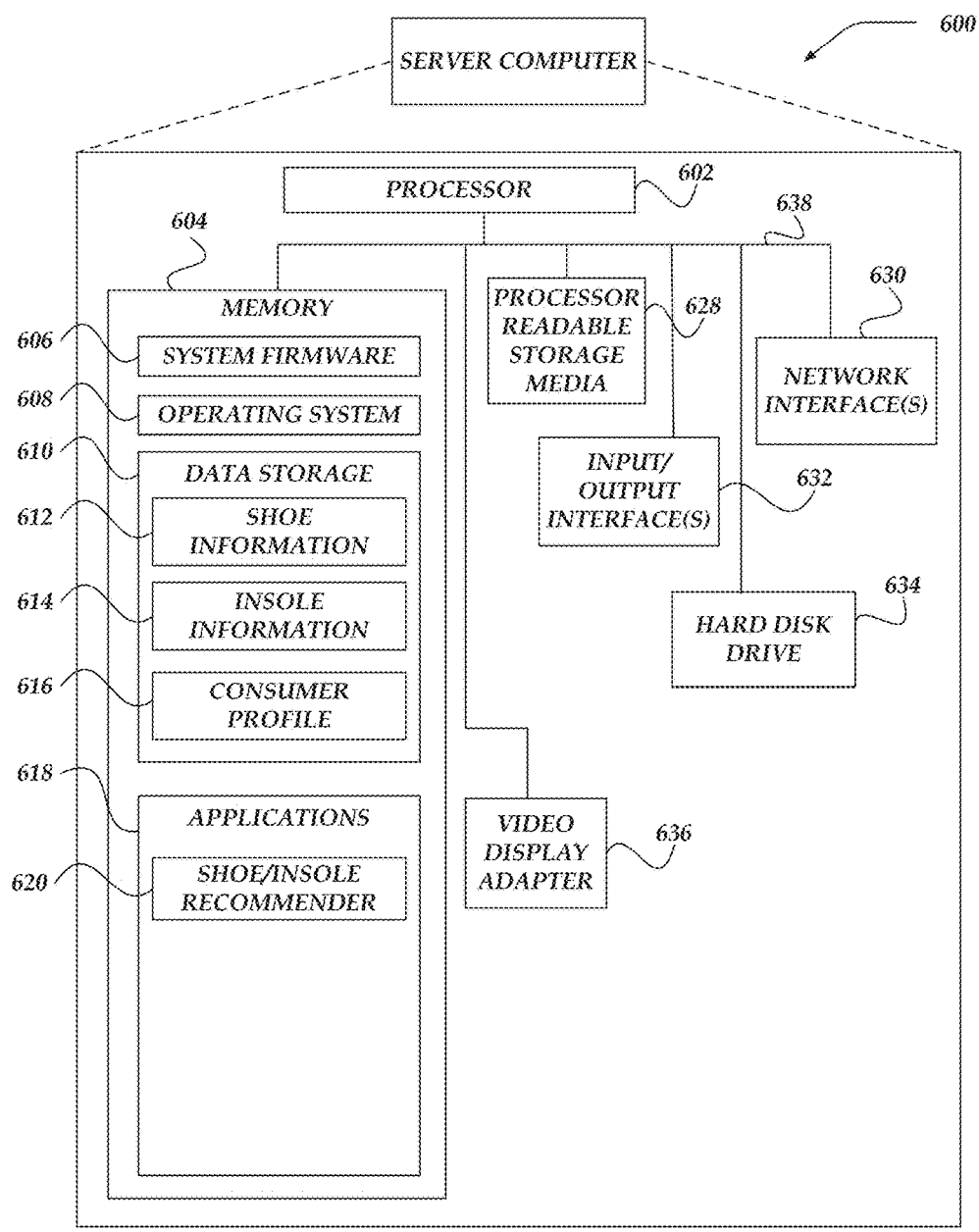
FIG. 6 shows an embodiment of a server computer that may be included in a system such as that shown in FIG. 4.

FIG. 6 shows one embodiment of a server computer 600, according to one embodiment of the invention. Server computer 600 may include many more or less components than those shown. The components shown, however, are sufficient to disclose an illustrative embodiment for practicing the invention. Server computer 600 may represent, for example shoe/insole recommender server computer 410 of FIG. 4.

Server computer 600 may include processor 602, processor readable storage media 628, network interface unit 630, an input/output interface 632, hard disk drive 634, video display adapter 636, and memory 604, all in communication with each other via bus 638. In some embodiments, processor 602 may include one or more central processing units.

As illustrated in FIG. 6, server computer 600 also can communicate with the Internet, or some other communications network, via network interface unit 630, which is constructed for use with various communication protocols including the TCP/IP protocol. Network interface unit 630 is sometimes known as a transceiver, transceiving device, or network interface card (NIC).

Server computer 600 also comprises input/output interface 632 for communicating with external devices, such as a keyboard or other input or output devices not shown in FIG. 6. Input/output interface 632 can utilize one or more communication technologies, such as USB, infrared, Bluetooth™, or the like.

Memory 604 generally includes RAM, ROM, and/or one or more permanent mass storage devices, such as hard disk drive 634, tape drive, optical drive, and/or floppy disk drive. Memory 604 stores operating system 608 for controlling the operation of server computer 600. Any general-purpose operating system may be employed. System firmware 606 is also provided for controlling the low-level operation of server computer 600 (e.g., BIOS).

Although illustrated separately, memory 604 may include processor readable storage media 628. Processor readable storage media 628 may be referred to and/or include computer readable media, computer readable storage media, and/or processor readable storage device. Processor readable storage media 628 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 604 further includes one or more data storage 610, which can be utilized by server computer 600 to store, among other things, applications 618 and/or other data. For example, data storage 610 may also be employed to store information that describes various capabilities of server computer 600. The information may then be provided to another device based on any of a variety of events, including being sent as part of a header during a communication, sent upon request, or the like.

Data storage 610 may also include a database, text, spreadsheet, folder, file, or the like, that may be configured to maintain and store user account identifiers, user profiles, email addresses, IM addresses, and/or other network addresses; or the like. Data storage 610 may further include program code, data, algorithms, and the like, for use by a processor, such as processor 602 to execute and perform actions. In one embodiment, at least some of data store 610 might also be stored on another component of server computer 600, including, but not limited to processor-readable storage media 628, hard disk drive 634, or the like. Data storage 610 may include shoe information 612, insole information 614, and consumer profile 616. Shoe information 612 may be an embodiment of shoe information 512 of FIG. 5. Insole information 614 may be an embodiment of insole information 514 of FIG. 5. And consumer profile 616 may store a plurality of consumer profiles (e.g., consumer profile 516 of FIG. 5) for a plurality of different consumers.

Applications 618 may include computer executable instructions, which may be loaded into mass memory and run on operating system 608. Examples of application programs may include transcoders, schedulers, calendars, database programs, word processing programs, Hypertext Transfer Protocol (HTTP) programs, customizable user interface programs, IPSec applications, encryption programs, security programs. SMS message servers, IM message servers, email servers, account managers, and so forth.

Applications 618 may include shoe/insole recommender 620, which may be an embodiment of shoe/insole recommender 522 of FIG. 5. So, in some embodiments, server computer 600 may be enabled to employ various embodiments, combinations of embodiments, processes, or parts of processes, as described herein.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method performed by at least one computer, comprising:

determining shoe information for each of a plurality of shoes, wherein the shoe information includes three-dimensional (3D) characteristics of an inside of a shoe, wherein the 3D characteristics of the inside of the shoe include an internal height of the shoe;

determining insole information for a plurality of insoles, wherein the insole information includes 3D characteristics of an exterior of an insole;

automatically determining foot information for a consumer's foot by the at least one computer based on a 3D scan of the consumer's foot by a 3D scanner, wherein the foot information includes 3D characteristics of a shape of the consumer's foot, wherein the 3D characteristics of the shape of the consumer's foot include a height of a top of the consumer's foot;

assigning a compatibility score to each combination of shoe and insole in a plurality of combinations of shoes in the plurality of shoes and insoles in the plurality of insoles, wherein assigning the compatibility score to each combination of shoe and insole comprises:

for each shoe of the plurality of shoes performing— for each insole of the plurality of insoles, automatically assigning by the at least one computer a compatibility score to a combination of the each shoe and the each insole according to a fit within the each shoe of the consumer's foot and the each insole according to the shoe information of the each shoe, the insole information of the each insole, and the foot information for the consumer's foot based on the 3D scan by the 3D scanner, wherein the compatibility score assigned to the combination of the each shoe and the each insole is based on a comparison of the internal height of the each shoe to the height of the top of the consumer's foot;

ranking selected combinations of shoes and insoles in the plurality of combinations of shoes and insoles relative to another one or more combinations of shoes and insoles in the plurality of combinations of shoes and insoles based on the compatibility scores assigned to the selected combinations of shoes and insoles relative to the compatibility scores assigned to the other one or more combinations of shoes and insoles, each selected combination including a specific shoe of the plurality of shoes and a specific insole of the plurality of insoles;

providing a recommendation to the consumer including the selected combinations of shoes and insoles based on the ranking of the selected combinations of shoes and insoles; and generating at least one of a shoe or an insole of the plurality of combinations with a 3D printer based on the recommendation.

2. The method of claim 1, wherein the shoe information includes at least a subset of more than one of an internal heel width, an internal forefoot shape, an internal length, and internal arch characteristics.

3. The method of claim 1, wherein the insole information includes at least a subset of more than one of a heel width, a forefoot width, a length, a thickness, and arch characteristics.

4. The method of claim 1, wherein the foot information based on the 3D scan of the consumer's foot by the 3D scanner includes at least a subset of more than one of a heel width, a forefoot width, a length, and arch characteristics.

5. The method of claim 1, wherein the recommendation includes a brand, style, and size of shoe and a brand, style, and size of insole.

6. The method of claim 1, further comprising:
receiving a selection of a selected shoe for use in comparing the shoe information, the foot information based on the 3D scan of the consumer's foot by the 3D scanner, and the insole information;
wherein the plurality of shoes includes the selected shoe.

7. The method of claim 1, wherein the 3D characteristics of the inside of the shoe include a plurality of internal shoe metrics, the 3D characteristics of the exterior of the insole include a plurality of external insole metrics, and the 3D characteristics of the shape of the consumer's foot include a plurality of foot metrics based on the 3D scan of the consumer's foot by the 3D scanner; and
wherein the compatibility score assigned to the combination of the each shoe and the each insole indicates a combination of i) respective differences between the plurality of internal shoe metrics of the each shoe and the plurality of foot metrics based on the 3D scan of the consumer's foot by the 3D scanner and ii) respective differences between the plurality of internal shoe metrics of the each shoe and the plurality of external insole metrics of the each insole.

8. A system comprising:
a foot information computer that determines foot information for a consumer's foot based on a three-dimensional (3D) scan of the consumer's foot, wherein the foot information includes 3D characteristics of a shape of the consumer's foot, wherein the 3D characteristics of the shape of the consumer's foot include a height of a top of the consumer's foot;
a recommendation computer that compares the foot information based on the 3D scan of the consumer's foot, shoe information that includes internal heights for a plurality of shoes, and insole information for a plurality of insoles to determine at least one combination of shoe and insole that is compatible with the consumer's foot by—
assigning a compatibility score to each combination of shoe and insole in a plurality of combinations of shoes in the plurality of shoes and insoles in the plurality of insoles, wherein assigning the compatibility score to each combination of shoe and insole comprises:
for each shoe of the plurality of shoes performing—
for each insole of the plurality of insoles, assigning a compatibility score to a combination of the each shoe and the each insole according to a fit within the each shoe of the consumer's foot and the each insole according to the shoe information of the each shoe, the insole information of the each insole, and the foot information for the consumer's foot based on the 3D scan by the 3D scanner, wherein the compatibility score assigned to the combination of the each shoe and the each insole is based on a comparison of the internal height of the each shoe to the height of the top of the consumer's foot;
ranking selected combinations of shoes and insoles in the plurality of combinations of shoes and insoles relative to another one or more combinations of shoes and insoles in the plurality of combinations of shoes and insoles based on the compatibility scores assigned to the selected combinations of shoes and insoles relative to the compatibility scores assigned to the other one or more combinations of shoes and insoles, each selected combination including a specific shoe of the plurality of shoes and a specific insole of the plurality of insoles; and
providing a recommendation of the selected combinations of shoes and insoles to the consumer based on the ranking of the selected combinations of shoes and insoles; and
a 3D printer that generates at least one of a shoe or an insole of the plurality f combinations based on the recommendation.

9. The system of claim 8, wherein the shoe information includes at least a subset of more than one of an internal heel width, an internal forefoot shape, an internal length, and internal arch characteristics.

10. The system of claim 8, wherein the insole information includes at least a subset of more than one of a heel width, a forefoot width, a length, a thickness, and arch characteristics.

11. The system of claim 8, wherein the foot information based on the 3D scan of the consumer's foot includes at least a subset of more than one of a heel width, a forefoot width, a length, and arch characteristics.

12. The system of claim 8, wherein the recommendation includes a brand, style, and size of shoe and a brand, style, and size of insole.

13. The system of claim 8, wherein the recommendation computer further:
receives a selection of a selected shoe for use in comparing the shoe information, the foot information based on the 3D scan of the consumer's foot, and the insole information;
wherein the plurality of shoes includes the selected shoe.

14. The system of claim 8, wherein the recommendation computer further:
receives a selection of a selected insole for use in comparing the shoe information, the foot information based on the 3D scan of the consumer's foot, and the insole information; wherein the plurality of insoles includes the selected insole.

15. A network computer, comprising:
a memory for storing at least instructions; and
a processor that executes the instructions to perform actions, including:
determining foot information for a consumer's foot based on a three-dimensional (3D) scan of the consumer's foot by a 3D scanner, wherein the foot information includes 3D characteristics of a shape of the consumer's foot, wherein the 3D characteristics of the shape of the consumer's foot include a height of a top of the consumer's foot;
comparing the foot information, shoe information for a plurality of shoes, and insole information for a plurality of insoles to determine at least one combination of shoe and insole that is compatible with the consumer's foot by—
assigning a compatibility score to each combination of shoe and insole in a plurality of combinations of shoes in the plurality of shoes and insoles in the plurality of insoles, wherein assigning the compatibility score to each combination of shoe and insole comprises:
for each shoe of the plurality of shoes performing—
for each insole of the plurality of insoles, assign a compatibility score to a combination of the each shoe and the each insole according to a fit within the each shoe of the consumer's foot and the each insole according to the shoe information of the each shoe, the insole information of the each insole, and the foot information for the consumer's foot based on the 3D scan by the 3D scanner, wherein the shoe information of the each shoe includes an internal height of the each shoe, wherein the compatibility score assigned to the combination of the each shoe and the each insole is based on a comparison of the internal height of the each shoe to the height of the top of the consumer's scanned foot; and selecting as the at least one combination selected combinations of shoes and insoles in the plurality of combinations of shoes and insoles based on the compatibility scores assigned to the selected combinations of shoes and insoles relative to the compatibility scores assigned to another one or more combinations of shoes and insoles in the plurality of combinations of shoes and insoles, each selected combination including a specific shoe of the plurality of shoes and a specific insole of the plurality of insoles;

providing a recommendation to the consumer of the selected combinations of shoes and insoles based on the selecting as the at least one combination; and generating at least one of a shoe or an insole with a 3D printer based on the recommendation.

16. The network computer of claim 15, wherein the shoe information includes at least a subset of more than one of an internal heel width, an internal forefoot shape, an internal height, and internal arch characteristics.

17. The network computer of claim 15, wherein the insole information includes at least a subset of more than one of a heel width, a forefoot width, a length, a thickness, and arch characteristics.

18. The network computer of claim 15, wherein the foot information based on the 3D scan of the consumer's foot by the 3D scanner includes at least a subset of more than on of a heel width, a forefoot width, a length, and arch characteristics.

19. The network computer of claim 15, wherein the recommendation includes a brand, style, and size of shoe and a brand, style, and size of insole.

20. The network computer of claim 15, wherein the processor executes the instructions to perform further actions, comprising:
receiving a selection of a selected shoe for use in comparing the shoe information, the foot information based on the 3D scan of the consumer's foot by the 3D scanner, and the insole information; wherein the plurality of shoes includes the selected shoe.

21. A processor readable non-transitory storage media that includes instructions, wherein execution of the instructions by a processor performs actions, comprising:
determining foot information for a consumer's foot based on a three-dimensional (3D) scan of the consumer's foot by a 3D scanner, wherein the foot information includes 3D characteristics of a shape of the consumer's foot, wherein the 3D characteristics of the shape of the consumer's foot include a height of a top of the consumer's foot;
comparing the foot information, shoe information for at least a plurality of shoes, and insole information for a plurality of insoles to determine at least one combination of shoe and insole that is compatible with the consumer's foot by
assigning a compatibility score to each combination of shoe and insole in a plurality of combinations of shoes in the plurality of shoes and insoles in the plurality of insoles, wherein assigning the compatibility score to each combination of shoe and insole comprises:
for each shoe of the plurality of shoes performing—
for each insole of the plurality of insoles, assign a compatibility score to a combination of the each shoe and the each insole according to a fit within the each shoe of the consumer's foot and the each insole according to the shoe information of the each shoe, the insole information of the each insole, and the foot information for the consumer's foot based on the 3D scan by the 3D scanner, wherein the shoe information of the each shoe includes an internal height of the each shoe, wherein the compatibility score assigned to the combination of the each shoe and the each insole is based on a comparison of the internal height of the each shoe to the height of the top of the consumer's scanned foot; and
selecting as the at least one combination selected combinations of shoes and insoles in the plurality of combinations of shoes and insoles based on the compatibility scores assigned to the selected combinations of shoes and insoles relative to the compatibility scores assigned to another one or more combinations of shoes and insoles in the plurality of combinations of shoes and insoles, each selected combination including a specific shoe of the plurality of shoes and a specific insole of the plurality of insoles;
providing a recommendation to the consumer of the selected combinations of shoes and insoles based on the selecting as the at least one combination; and
generating at least one of a shoe or an insole of the plurality of combinations with a 3D printer based on the recommendation.

22. The media of claim 21, wherein the shoe information includes at least a subset of more than one of an internal heel width, an internal forefoot shape, an internal length, and internal arch characteristics.

23. The media of claim 21, wherein the insole information includes at least a subset of more than one of a heel width, a forefoot width, a length, a thickness, and arch characteristics.

24. The media of claim 21, wherein the foot information based on the 3D scan of the consumer's foot by the 3D scanner includes at least a subset of more than one of a heel width, a forefoot width, a length, and arch characteristics.

25. The media of claim 21, wherein the recommendation includes a brand, style, and size of shoe and a brand, style, and size of insole.

26. The media of claim 21, further comprising:
receiving a selection of a selected shoe for use in comparing the shoe information, the foot information based on the 3D scan of the consumer's foot by the 3D scanner, and the insole information;
wherein the plurality of shoes includes the selected shoe.

* * * * *